UNITED STATES PATENT OFFICE.

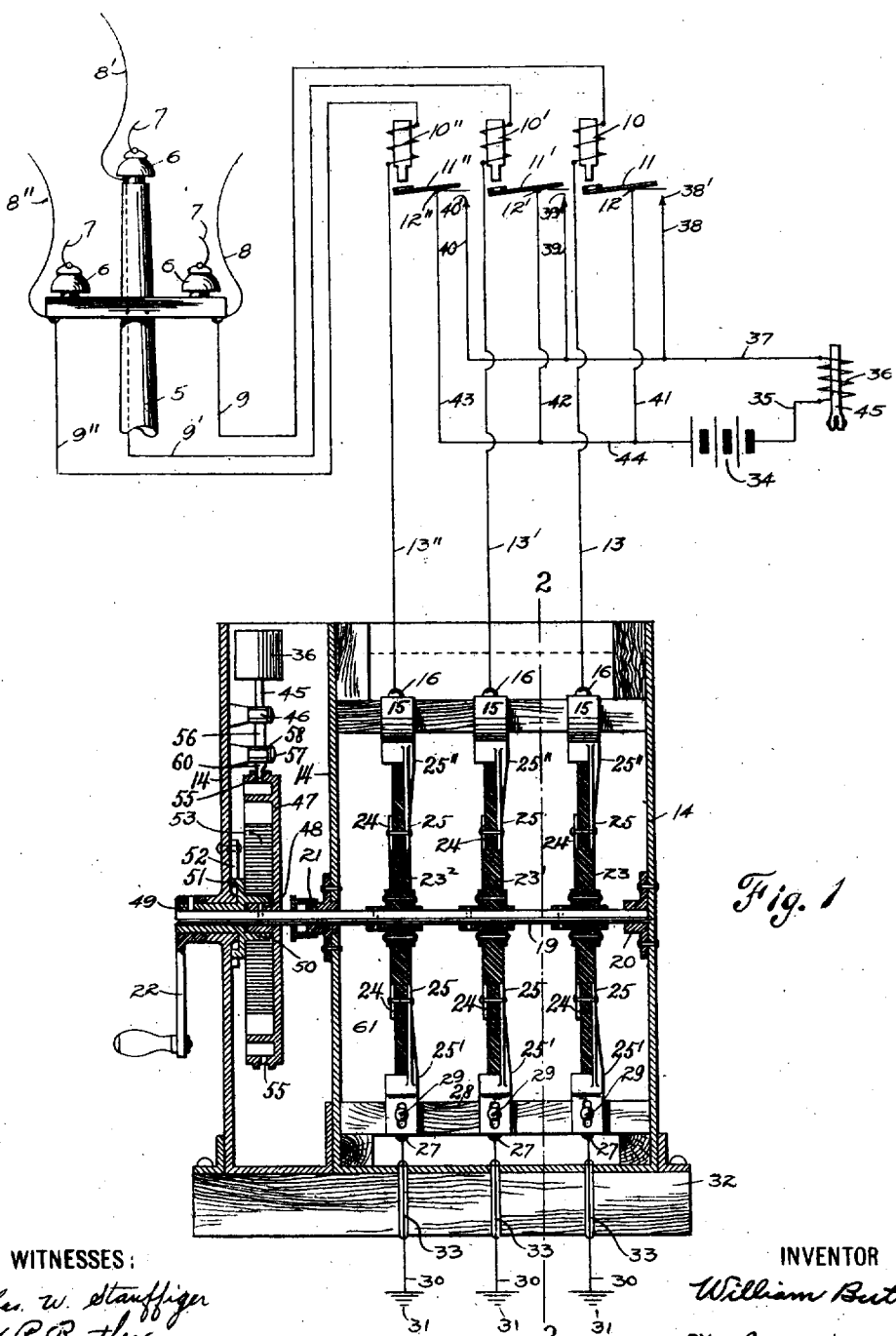

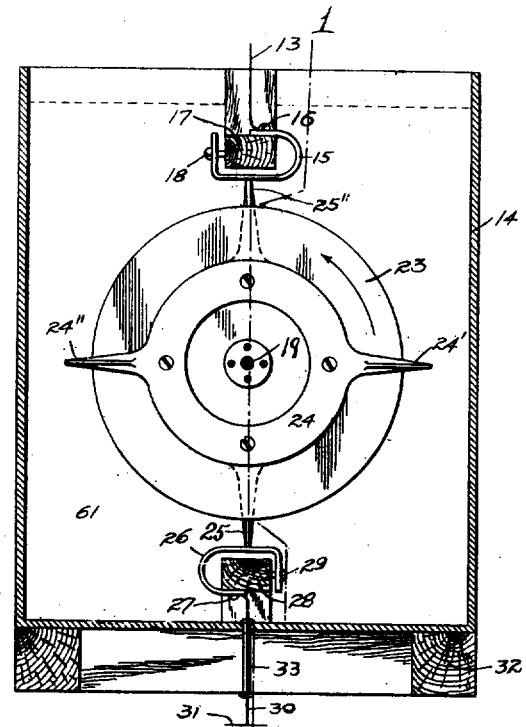
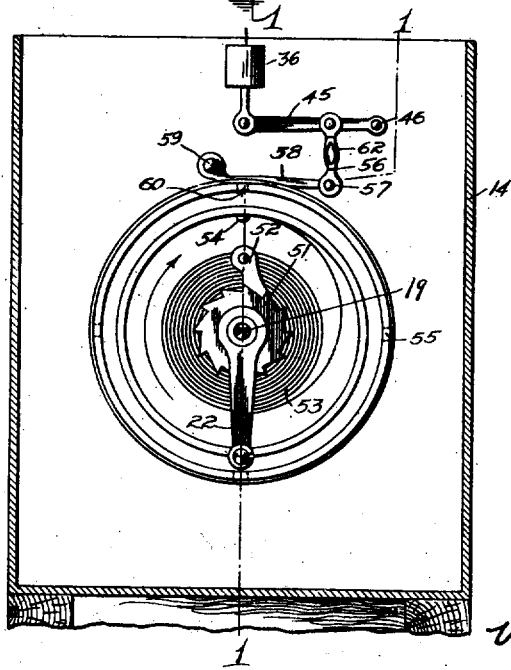

WILLIAM BUTLER, OF LOCKPORT, NEW YORK.

LIGHTNING-ARRESTER.

974,859.   Specification of Letters Patent.   Patented Nov. 8, 1910.

Application filed June 13, 1908. Serial No. 438,346.

*To all whom it may concern:*

Be it known that I, WILLIAM BUTLER, a citizen of the United States of America, and a resident of the city of Lockport, in the county of Niagara and State of New York, have invented certain new and useful Improvements in Lightning-Arresters, of which the following is a full, clear, and exact description.

My invention relates in general to lightning arresters and more particularly to means to be used in connection with high voltage transmission line circuits.

In producing my invention my object has been to provide a means for conducting to the ground any lightning discharges affecting the power line or any abnormal voltages however caused on the line, and to so construct such means that such lightning discharges and abnormal voltages will immediately go to ground and after being so conducted to ground the line current that may momentarily follow will be quickly restored to the line and the ground circuit will be restored for subsequent like emergencies.

The many advantages resulting from the employment of my invention will be clear to those skilled in the art after the following description.

Referring now to the accompanying drawings in which like characters of reference refer to corresponding parts throughout the several figures: Figure 1 is a view partly in diagram and partly in vertical longitudinal section on the line 1—1 of Figs. 2 and 3, of my complete invention. Fig. 2 is a vertical transverse section on the line 2—2 of Fig. 1 of my ground line switch looking toward the right-hand end of the switch-box. Fig. 3 is an end elevation looking at the left-hand end of the switch-box shown in Fig. 1 the left hand side of the switch box being omitted.

5 is the ordinary pole of a transmission line provided with the ordinary horn-gap protectors 6 which carry the line wires 7. In this description it is assumed that the line wire carries a high voltage transmission three-phase current but it will be understood that my invention is equally as well adapted to any kind of a high voltage transmission current of any phase. Suitably insulated from the transmission line are horn-type arresters 8, 8' and 8", which are arranged so that any desired air gap may be made between the line wire and the said arresters 8, 8' and 8". This arrangement is of course well-known.

Suitably connected to each of the horn arresters 8 8' and 8" are wires 9 9' and 9" which lead to magnets 10 10' and 10" of relays having governing armatures 11 11' and 11" which are pivoted at 12 12' and 12". Leading from the said magnets 10 10' and 10" are wires 13 13' and 13" which pass through the ground line switch-box 14 and are electrically connected with spring band contacts 15. These spring band contacts are rigidly secured at one end by fastenings 16 to a suitable support 17 carried in the switch-box 14 and the other ends of the said spring contacts slide loosely having slot and pin connection 18 with the support 17 as clearly shown in Fig. 2.

In the switch-box 14 is suitably journaled a shaft 19 in a bearing 20 secured at one side of the switch-box and a packing box 21 at the other side of said switch-box. This shaft extends to the outside of the switch-box and to it may be secured a handle 22 the purpose of which will be hereinafter described. Rigidly secured to the shaft 19 are insulator disks 23 23' 23". The number of these disks will be the same as the number of the transmission wires to be protected and will be the same as the number of the relay magnets 10 10' and 10" which are connected in circuit to the ground through electric contact fingers carried on said insulator disks. Each of the disks 23 23' and 23" carries a pair of electric conductors 24 and 25 electrically insulated from each other. Each of the electric conductors 24 and 25 carries two contact fingers 24' and 24", and 25' and 25". It will of course be understood that the electric conductors 24 and 25 besides being insulated from each other are likewise insulated from the shaft 19.

The contact points 24' 24" and 25' 25" are adapted, when in proper position, to make electrical contact, one of them with the spring band contact 15 and the other opposite one with a similar spring band contact 26 which, like the spring band contact 15, is suitably supported at one end by fastenings 27 to a support 28 carried by the switch-box, and the other end slides loosely having slot and pin connection 29 with the support 28. The spring band contact 26 is electrically connected by wires or other suitable means 30 to the ground 31. The wires 30 pass through the base support 32 of the switch-box 14 and are suitably insulated therefrom as clearly shown at 33 (see Figs. 1 and 2).

For a purpose hereinafter described, I provide a local or secondary circuit which is suitably supplied from a source of electric energy 34 from which a wire 35 leads to a solenoid 36 and a wire 37 leads from the solenoid 36 and to it are secured additional wires 38 39 and 40 leading to the back contact points 38′ 39′ and 40′ which are controlled by the armatures 11 11′ and 11″. Connecting the pivotal points of the said armatures 11 11′ and 11″ are wires 41 42 and 43 which join a common wire 44 leading back to the source of energy 34. The solenoid 36 governs a bell crank armature 45 which is suitably pivoted at 46 to the frame of the switch-box 14.

The shaft 19 carries a spring casing 47 mounted on a sleeve 48 which is integral therewith and which is suitably splined to said shaft. At the left-hand end of the shaft 19 there is loosely mounted on the shaft a sleeve 49 which is provided with an extension sleeve 50 adapted to loosely ride over the casing sleeve 48. The sleeve 49 likewise carries integral with it a ratchet wheel 51 which is adapted to mesh with a dog 52 suitably secured to the frame of the casing 48. I have shown the handle 22 locked in place on the sleeve 49 but it will be understood that any other suitable means for winding may be secured to this sleeve for the purpose for which the handle is used as herein shown. One end of the coil spring 53 is rigidly secured to the extension sleeve 50 and the other end of said coil spring 53 is rigidly secured to the spring casing 47 as clearly shown at 54 in Fig. 3. The periphery of the spring casing 47 is provided with radial recesses 55.

Attached to the armature 45 of the solenoid 36 is a lever 56 which is pivotally secured at 57 to a second lever 58; the lever 58 being pivotally secured at 59 to the switch box 14. The lever 58 is provided with a lug 60 which is adapted, when in position, to register with any one of the recesses 55 in the spring casing 47.

I so construct my switch-box 14 that it is separated into two compartments one of which is adapted to hold oil for insulation. The oil-box compartment 61 is clearly shown in Figs. 1 and 2. The purpose of the oil is to immerse the electric conductors 24 and 25 and provide an insulation means between them and their contact fingers 24′ 24″ 25′ and 25″.

Having thus described the several parts of my invention I will now describe the method of its operation.

Suitable power is first stored up in the switch-box 14 by turning the handle 22 so that the coil spring 53 will be placed under tension and thus when released it will revolve the shaft 19 and carry with it the electric conductors 24 and 25 together with their contact fingers 24′ and 24″ and 25′ and 25″. It will be evident from the description of my invention that this stored power may be obtained by other means than the use of a spring, for instance, suitable motor power or a storage battery might be used for the same purpose and accomplish the same ends.

After power has been stored in the switch-box 14 in the manner described the horn-type arresters 8 are adjusted so as to make the least possible air space between them and the line wires so as to prevent an arc being formed between the line wires and the said arresters during the transmission of the ordinary current. Whenever an abnormal high voltage is produced in the line wires by any means an arc will be formed between the said line wires and the said arresters 8 so that a short circuit to the ground will be produced which comprises the following elements: the horn-type arresters 8, wires 9 9′ and 9″, magnets 10 10′ and 10″, wires 13 13′ and 13″, spring band contacts 15, either pair of contact fingers 24′ and 24″ or 25′ and 25″ of the electric conductors 24 or 25 respectively, spring band contacts 26, wires 30 to the ground 31. Current traversing the circuit just described will energize the magnets 10 10′ and 10″ thus attracting the armatures 11 11′ and 11″ closing them at their normally open points, at their core pieces and at the contact points 38′ 39′ and 40′. This energization of the magnets 10 10′ and 10″ thus completes the local or secondary circuit which will then comprise the following elements: battery 34, solenoid 36, wires 37, 38, 39, 40, 41, 42, 43 and 44 back to the battery. It will be noted that the local or secondary circuit will be completed whenever any one of the armatures 11 11′ and 11″ are moved to close their normally open points since they are all arranged in multiple with the battery circuit. Current flowing through the said local or secondary circuit as described energizes the solenoid 36 thus attracting its bell crank armature 45 and lifting the levers 56 and 58 so that the lug 60 is pulled away from one of the recesses 55 in the spring casing 47 and power of the coil spring turns the spring casing 47 carrying with it the shaft 19 and thus revolving the electric conductors 24 and 25 which in such revolution carry the pair of contact points 24' and 24" and 25' and 25" through a partial revolution. This partial revolution of the said contact fingers breaks the ground circuit and that breaking of the ground circuit deënergizes the solenoid 36 thus releasing the lever 58 and allowing it to ride upon the periphery of the spring casing 47 until the lug 60 drops into the next recess 55 when the spring casing ceases its revolution and the contact fingers complete a ground circuit.

It will be noted that at 62 I have provided a turn buckle arrangement for properly adjusting the movement of the lever 58 so that the lug 60 will always fall into proper registration with the recesses 55 whenever the casing is revolved.

It will be evident from the foregoing description that an excess voltage passing over the transmission line will be conducted through the ground circuit to the ground and then the ground circuit will be immediately completed and the transmitted current will be carried without interruption along the transmission line. It is well-known that these excess voltages are only momentary and require but a short time for their transmission to the ground and it will be clear that my invention provides means for these momentary discharges and then immediately restores the ground circuit complete after the discharges have taken place thus eliminating such momentary discharges without interrupting the transmitted current. Whenever I have referred in the foregoing description to excess voltages I have meant to include in said term lightning discharges or line surges either of which may cause an interruption in the transmission of the current.

It will be clear from the foregoing description that whenever a short circuit is made between the line wires and any of the wires in the ground circuit, the local or secondary circuit will be completed thus energizing the solenoid 36 and allowing the spring casing 47 to revolve until the short circuit is removed or the power of the spring is exhausted. The revolution of the spring casing 47 caused by the power of the spring 53 is so arranged with reference to the electric conductors 24 and 25 that when the spring power is exhausted the contact fingers 24' and 24" and 25' and 25" are all free from electrical contact with the spring contacts 15 and 26 so that the ground circuit is opened. Of course it is possible to store any desired amount of power in the spring 53 or in the storage battery or electric motor used for the purpose described but the apparatus is always so arranged on the side of safety that the arresters will break the ground circuit in case of short circuiting or in case the power has been exhausted.

It will be evident to those skilled in the art that my device may be used on any high voltage transmission line.

Having thus described my invention what I claim is:

1. The combination, with a pole having a horn type arrester; of a magnet, a governing armature, a wire connecting the horn type arrester with the magnet, a switch box, supports, contacts secured to the supports, a wire connecting the magnet with one of the contacts, a wire connecting the other contact with the ground, a shaft journaled in the box, an insulator disk rigidly secured to the shaft between the contacts and carrying a pair of electric conductors each having two contact fingers, and a motor power by which the shaft is rotated.

2. The combination, with a pole having a horn type arrester; of a magnet, a governing armature, a wire connecting the horn type arrester with the magnet, a switch box, supports, contacts secured to the supports, a wire connecting the magnet with one of the contacts, a wire connecting the other contact with the ground, a shaft journaled in the box, an insulator disk rigidly secured to the shaft between the contacts, and carrying a pair of electric conductors each having two contact fingers, a source of electric energy, a solenoid, a wire leading from the source of electric energy to the solenoid, an armature contact point, a wire leading from the solenoid to the armature contact point, a wire connecting the pivotal point of the armature to the said source of electric energy, a bell crank armature, governed by the solenoid and a motor power connected with the solenoid by which the shaft is rotated.

3. The combination, with a pole having a horn type arrester; of a magnet, a governing armature, a wire connecting the horn type arrester with the magnet, a switch oil box, supports, spring band contacts rigidly secured at one end to their supports and at their other ends having slot and pin connection therewith, a wire connecting the magnet with one of the spring band contacts, a wire connecting the other spring band contact with the ground, a rotary shaft journaled in the oil box and extending therebeyond, an insulator disk rigidly secured to the shaft between the spring band contacts and carrying a pair of electric conductors each having two contact fingers, a source of electric energy, a solenoid, a wire leading from said source of electric energy to the solenoid, an armature contact point, a wire leading from the solenoid to the armature contact point, a wire connecting the pivotal point of the armature to the said source of electric energy, a bell crank armature, governed by the solenoid, a spring casing, formed with radial recesses in its periphery and having a sleeve fixed to the shaft, a sleeve loosely mounted on the shaft and provided with a ratchet wheel and an extension sleeve loosely riding on the casing-sleeve, a dog engaging the ratchet wheel, a coil spring secured at one end to the extension sleeve and the other end to the casing, a lever provided with a lug adapted to engage in the radial recesses and a lever connecting the bell crank armature with the lug-lever.

In testimony whereof, I have hereunto set my hand in the presence of two witnesses.

WILLIAM BUTLER.

Witnesses:
ETHEL A. KELLY,
J. WM. ELLIS.